(12) United States Patent
Sinclaire

(10) Patent No.: US 6,682,018 B2
(45) Date of Patent: Jan. 27, 2004

(54) RELEASABLE CONTROL YOKE ANCHOR SYSTEM FOR KITE

(76) Inventor: Maya Sinclaire, #305-1830 Alberni Street, Vancouver (CA), V6G 2Z2

( * ) Notice: Subject to any disclaimer, the term of this patent is extended or adjusted under 35 U.S.C. 154(b) by 0 days.

(21) Appl. No.: 09/911,224

(22) Filed: Jul. 24, 2001

(65) Prior Publication Data

US 2003/0164254 A1 Sep. 4, 2003

(51) Int. Cl.[7] .............................................. B63B 35/79
(52) U.S. Cl. ............................ 244/155 A; 244/155 R; 280/213; 114/39.21
(58) Field of Search ........................ 244/153 R, 155 R, 244/155 A, 904; 280/1, 810, 213, 292, 29, 210, 1.21; 114/39.11, 39.16, 39.18, 39.21, 39.29, 102.1, 102.11, 102.18, 102.29, 382, 39.13

(56) References Cited

U.S. PATENT DOCUMENTS 3,455,261 A * 7/1969 Perrin ..................... 114/39.15
4,049,287 A * 9/1977 Dudouyt ..................... 280/213
4,127,247 A * 11/1978 Strasilla ....................... 244/152
5,119,748 A * 6/1992 Nishimura ............. 114/102.16
5,642,683 A * 7/1997 Bedford .................... 114/102.1
6,260,803 B1 * 7/2001 Hunts ..................... 244/155 R

FOREIGN PATENT DOCUMENTS

| EP | 0278784 | * | 8/1988 | ........... B64C/31/02 |
| FR | 2695619 | * | 3/1994 | ........... B63B/35/79 |
| FR | 2695368 | * | 11/1994 | ........... B62B/15/00 |
| GB | 2341371 A | * | 3/2000 | ........... B63B/35/79 |
| WO | WO 02/18202 A1 | * | 3/2002 | ............ B63H/9/06 |

* cited by examiner

Primary Examiner—Michael J. Carone
Assistant Examiner—Gabriel S Sukman

(57) ABSTRACT

A control yoke anchor system 1 for many uses of wind powered objects. The wind-powered object is tethered by lines 5 to a control yoke 2, which is releasably attached to an anchoring member 3. This anchoring member is attached to an anchor 6. This invention, by putting the control yoke in the center of projected aerodynamic forces path before anchoring them solves the problem of the user having to bear all or a portion of the wind powered object's tensile force in his/her arms and at the same time it allows for unimpaired control.

19 Claims, 4 Drawing Sheets

FIG. 2
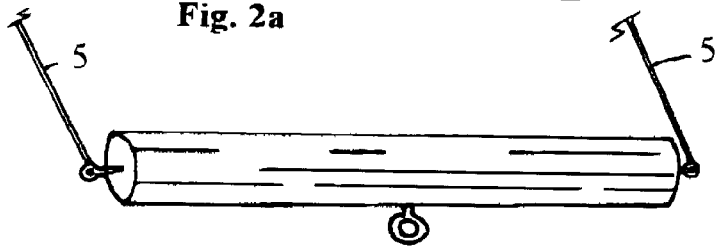
Fig. 2a
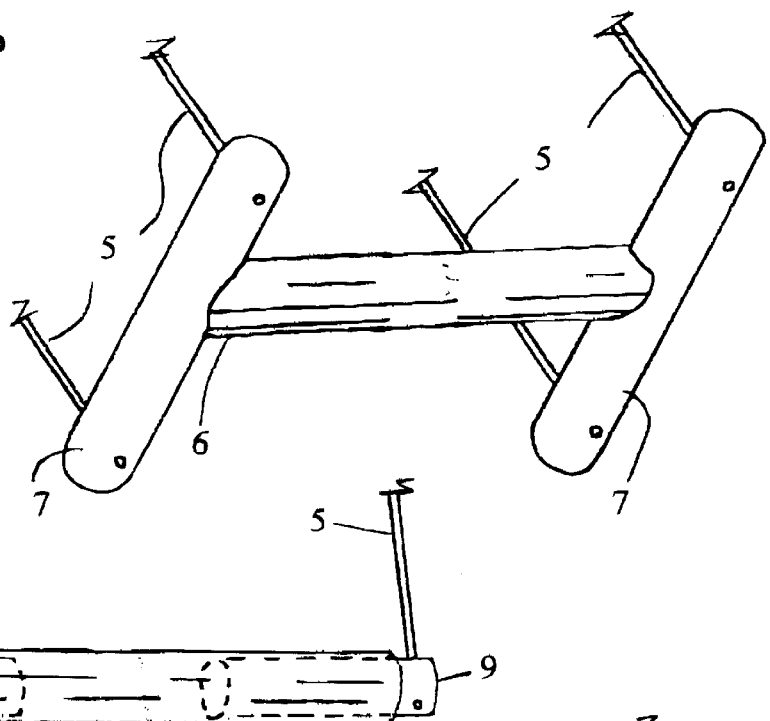
Fig. 2b
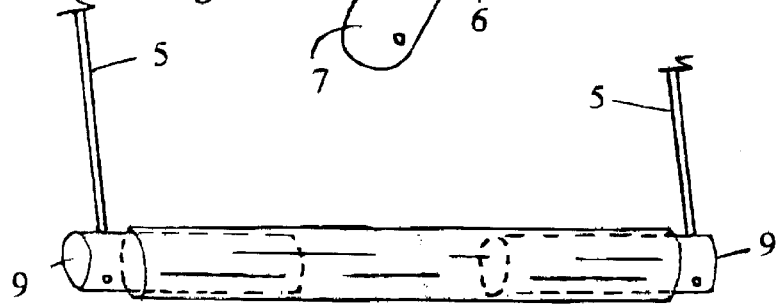
Fig. 2c
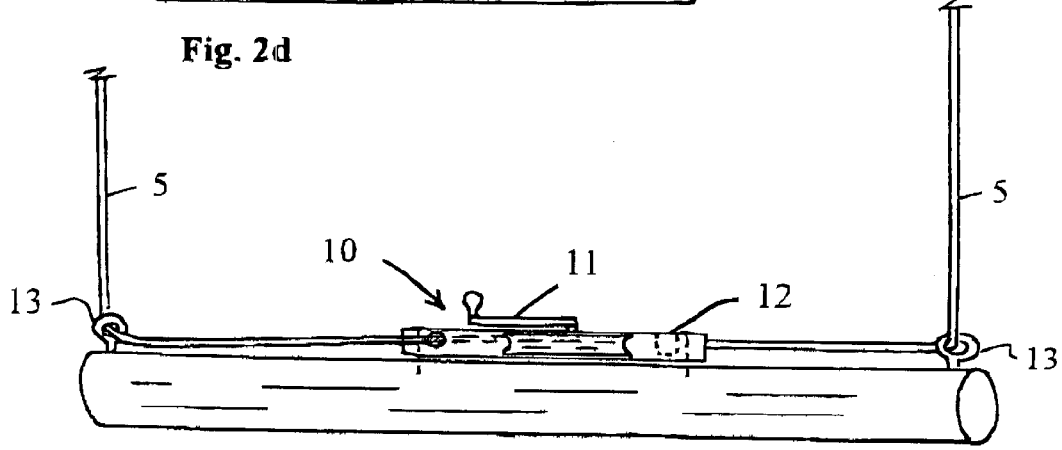
Fig. 2d

FIG. 3
Fig. 3a
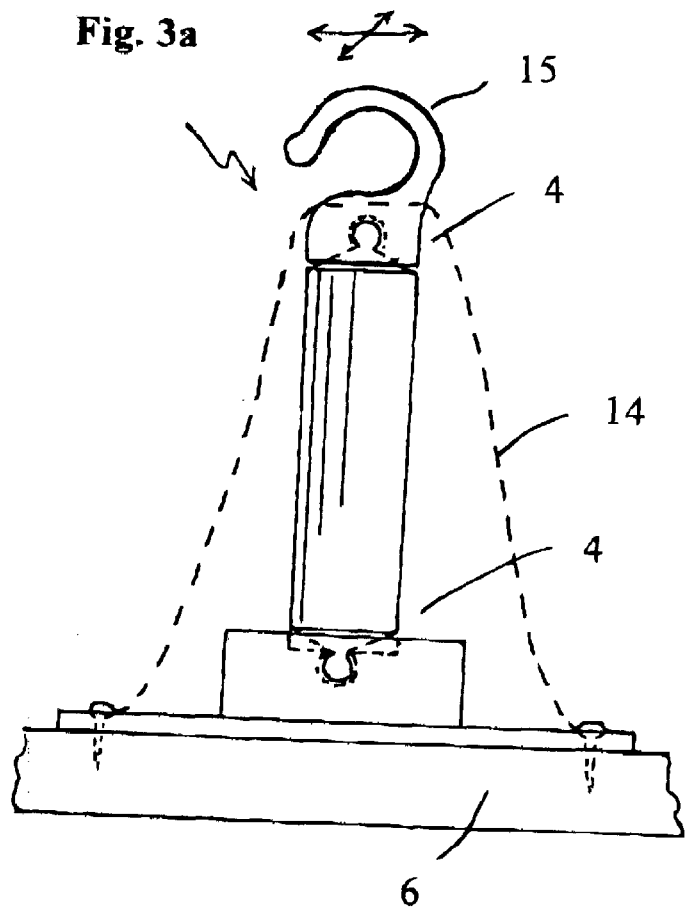
| Fig. 3b | Fig. 3c | Fig. 3d | Fig. 3e |
|---|---|---|---|
|  |  |  | 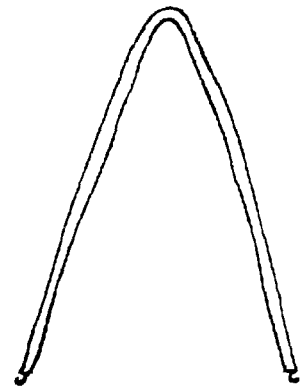 |

FIG. 4
Fig. 4a
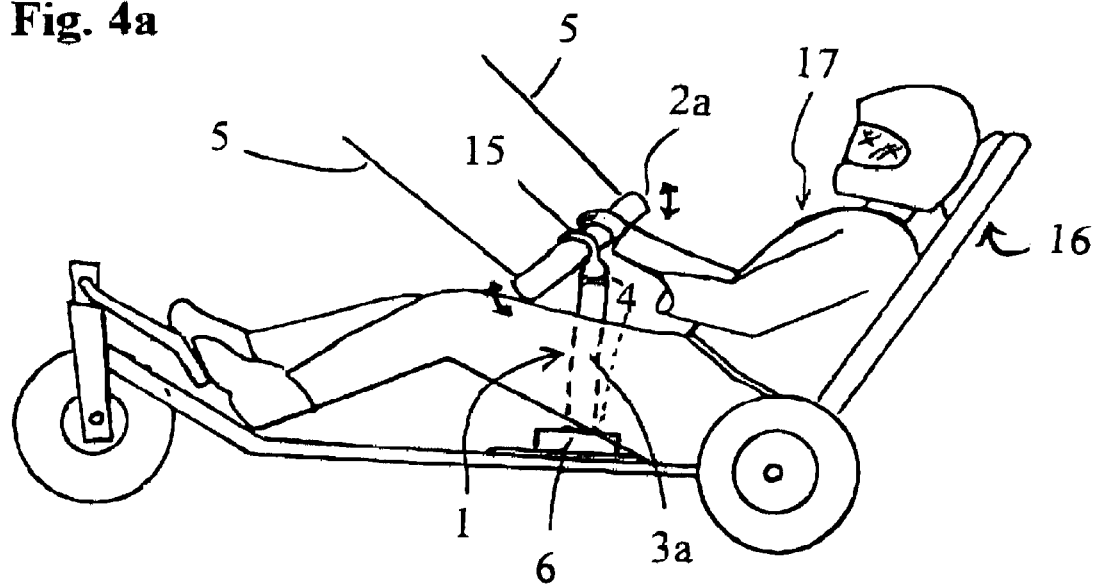
Fig. 4b
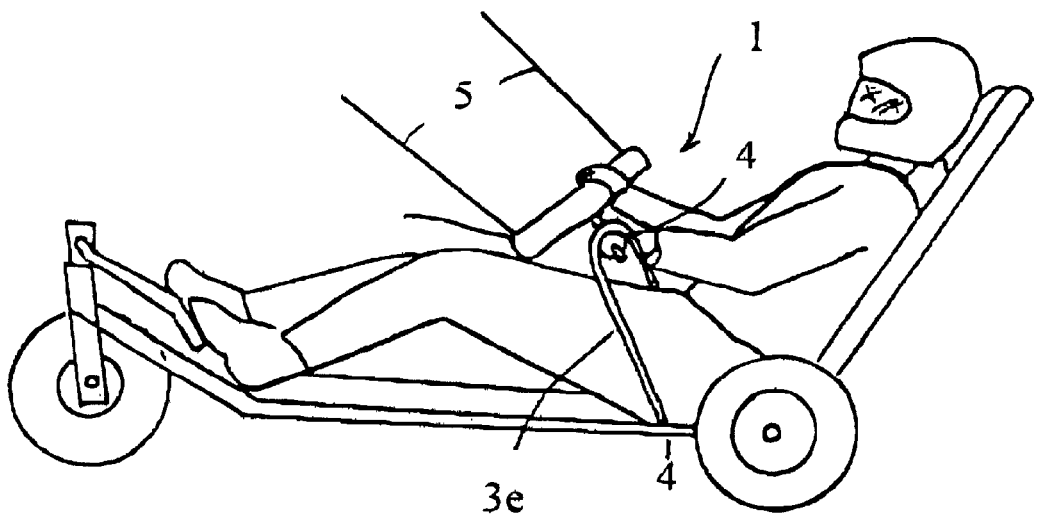

RELEASABLE CONTROL YOKE ANCHOR SYSTEM FOR KITE

FIELD OF THE INVENTION

This invention pertains to anchoring systems for user-manipulable yokes for controllably flying wind-powered objects, like a kite. In the system, the yoke is releasably coupled to land or a vehicle, such as a kite buggy, to transfer all of the kite's pulling force away from the user's arms, without impairing the user's ability to control the kite.

DESCRIPTION OF THE PRIOR ART

Wind powered object, like kites; have been used as propulsion devices in various ways. For example, skiers, snowboarders, ice skaters and roller skaters ski, snowboard, ice skate, or roller skate while holding one or more handles or a yoke connected to one or more wires attached to a flying kite. The user manipulates the yoke to control the kite such that wind forces propel the kite through the air, thereby pulling the yoke and the user along a snow, ice, pavement, water, or other surface. Surfers have also used kites as propulsion devices to propel a surfboard over the water as the surfer rides the surfboard and controls the flying kite by manipulating a hand-held yoke coupled to the kite. Flying kites similarly propel wheeled "kite buggies": the user sits in the kite buggy holding handles coupled to a flying kite. By suitably manipulating the handles the kite buggy rider controls the flying kite such that the kite's pulling forces are imparted to the handles, thereby propelling the rider and the kite buggy along a surface such as a beach.

Many people find it difficult to control flying kites via conventional handles, as described above. It generally requires someone who is very athletic and strong in the arms and upper torso to be able to hold and to maintain control of the kite for more than a relatively brief time interval via handles. Learners, especially, are exposed to great stresses on their body from the large pulling forces of the kite. Even the experienced users may develop problems such as back problems due to the tensile forces generated by the kite.

Some inventors attempted to solve this problem incorporating a system of pulleys. This was only a partial solution, since the pulleys averted only a portion of the pulling force, but mainly, this system limited the users control ability of the kite. Also, this system was able to accommodate only kites with maximum of two lead lines. Herment, French Patent No. 2 695 619-A1, attaches the kite to the board via one lead line (5) and then uses two separate hand held lines to control the kite (4). Nishimura, U.S. Pat. No. 5,134,951, invented an elongated U-shaped curvilinear harness line attached to the wishbone-configured boom.

All these systems are only a partial solution and create additional problems. They do take away only a portion of the pulling force of the kite and they limit the ability of the user to control the kite.

Another problem with prior art systems is that the kite lines are generally fixed in length, which poses some difficulties for users. It would be advantageous to have a system for allowing a user to adjust the length of the kite lines. There have been some attempts to create systems for rewinding the lines but they are too complex, heavy and difficult to operate, Hunt, U.S. Pat. No. 6,260,803 B1 .

The further described invention solves these shortcomings of the prior art.

BRIEF SUMMARY OF THE INVENTION

This invention, by putting the control yoke in the center of projected aerodynamic forces' path before anchoring them, solves the problem of the user having to bear all or a portion of the wind powered object's pulling force in his/her arms and at the same time it allows for unimpaired control.

The present invention provides a control yoke anchor system for many uses of wind-propelled objects for example a kite. The kite can be anchored to a land or to another object, for example a kite buggy. In its most basic form, the system comprises of two major components: the horizontal longitudinal member (control yoke) and the vertical longitudinal member (anchoring member). The control yoke is tethered to said kite by a plurality of kite wires. The vertical anchoring longitudinal member is on the upper end coupled at the substantial center (the center of the projected aerodynamic forces) to the control yoke, and on the lower end to the anchor, which in the case is the kite buggy.

The coupling of the upper, the lower, or both ends of the vertical longitudinal anchoring member can be pivotal, rigid, flexible, releasable or any combination of these.

There are many possible variants of the horizontal and the vertical longitudinal members with regard to the shape and material being used. For example the vertical anchoring member can comprise of a spring, cable, rope or a metal bar. Its shape can be a single longitudinal member or a loop that is oriented up or down, with the ends of the loop attached together at the anchor or at separate locations on the anchor.

In any embodiment, a winch may be provided for controllably extending and retracting one or more of the kite's control lines. Contrary to the other inventions, this invention enables the user to steer with only one hand. Therefore, the other hand is free to operate a handle of the winch, which solves the great problem of not being able to wind and alter the length of the kite lines.

A pulley could be provided on the control yoke for each one of the control lines, allowing each line to be entrained through a separate pulley so as to avoid tangling the lines.

BRIEF DESCRIPTION OF THE DRAWINGS

The preferred embodiments of the invention will be described by reference to the drawings in which:

FIG. 2a is a side view of a control yoke in the form of a bar.

FIG. 2b is a side view of a control yoke having end portions.

FIG. 2c is a side view of a control yoke having longitudinally extendible end portions.

FIG. 2d is a side view of a control yoke having an attached winch.

FIG. 3a is a side view of an anchoring member according to one aspect of the invention.

FIG. 3b is a side view of an anchoring member in the form of a rope.

FIG. 3c is a side view of an anchoring member in the form of a spring.

FIG. 3d is a side view of an anchoring member in the form of a loop.

FIG. 3e is a side view of an anchoring member in the form of a flexible loop.

FIG. 4a is a side elevational view of a kite buggy equipped with an anchoring system in accordance with a first embodiment of the invention.

FIG. 4b is a side elevational view of a kite buggy equipped with an anchoring system in accordance with a second embodiment of the invention.

DETAILED DESCRIPTION OF THE INVENTION

Figure 1:
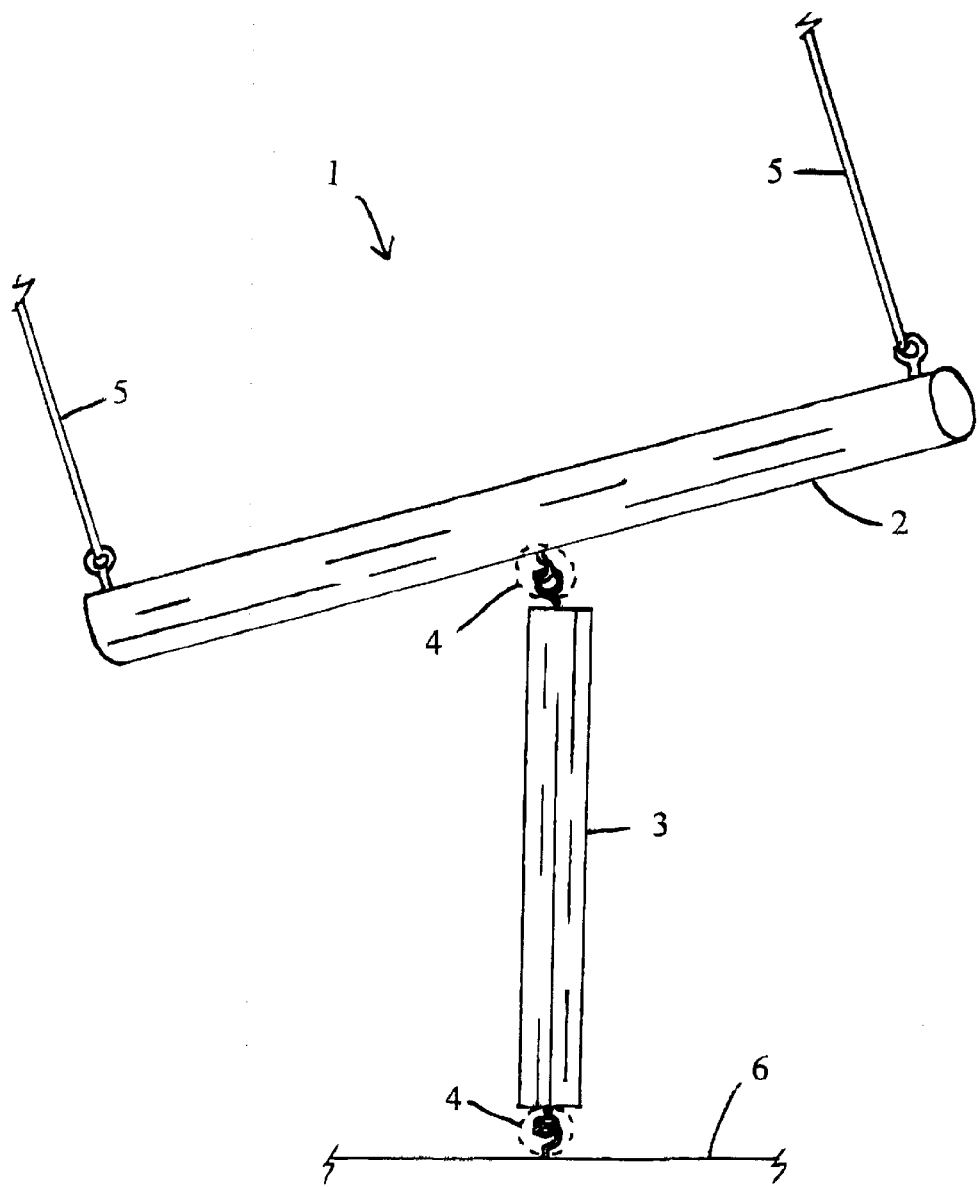
FIG. 1 is a side view of the releasable control yoke anchor system.

FIG. 1 shows the releasable control yoke anchor system 1. The system has two main parts: a control yoke, which is a first longitudinal member 2, and a second longitudinal anchoring member 3. The wind powered object's tethering lines 5 are attached at the opposing ends of the first longitudinal control member. To the center of this first longitudinal control member is coupled second longitudinal anchoring member. The reason why the coupling is in the center is, because this is the center of projected aerodynamic forces created by the wind-powered object. The lower portion of the second longitudinal anchoring member is coupled to an anchor 6, which could be land, water, vehicle or any other object. Therefore, the pulling force of the wind-powered object is transferred from the tethering lines into the control yoke and through the second longitudinal anchoring member into the anchor. The user does not have to bear any of these pulling forces and yet, by the control yoke being attached in the center of projected aerodynamic forces, the user can manipulate the control yoke in any direction he/she chooses with relative ease.

If desired, user may easily release the first longitudinal member, the control yoke 2, which is releasably attached to the second longitudinal anchoring member 3, by manipulating the first longitudinal member 2 out and away from the coupling.

The two couplings 4 of the second longitudinal anchoring member, one with the control yoke and one with the anchor could be any combination of them being rigid, flexible, swiveling, or releasable.

FIG. 2 shows top view of several examples of the possible embodiments of the control yoke 2a, 2b, 2c, and 2d.

In one embodiment of the invention, 2a, control yoke takes the form of a bar with the wind powered object tethering lines of the wind powered object attached at the opposite ends. For the coupling with the vertical longitudinal anchoring member, the bar has a loop in the middle that is either swiveling or solid. The mechanism for this coupling can be varied, for example it could be with a hook.

In another embodiment, FIG. 2b, the control yoke has end portions 7 to which tethering lines 5 are attached.

In another embodiment, shown in FIG. 2c, control yoke has longitudinally extendible end portions 9, which may aid in the launching and controlling of the kite.

FIG. 2d shows the control yoke with attached winch 10 for adjusting the length of kite wires 5. Alternatively, winch 10 may be otherwise fixed to some other convenient location.

In this embodiment of the invention, kite control wires 5 are entrained through guides 13; these could be pulleys, on control yoke 2 and wound upon winch 10. User is able to wind wires 5 onto winch 10 with winch handle 11. Stop means 12 may be provided for holding handle 11 stationary.

The inventor contemplates that various other winch systems are employable in the invention. The key to this embodiment of the invention is most generally that a winch be provided with the anchor system to play out, and play in, kite wires 5.

FIG. 3 show side views of several examples of the possible embodiments of the vertical longitudinal anchoring member 3a, 3b, 3c, 3d, and 3e. One embodiment of the anchoring member 3a is solid bar with two swivel mechanisms 4, a hook 15 for coupling to the control yoke, and a padding 14 for protection of the user. The lower portion of the anchoring member is attached to the anchor 6.

FIG. 3b, depicts one embodiment of the anchoring member which takes form of flexible rope.

FIG. 3c, depicts one embodiment of the anchoring member which takes form of flexible spring. In this embodiment it would be the most useful to incorporate a flexible rubber boot or sheath 14 to cover the spring and to protect the rider 17.

FIG. 3d, depicts one embodiment of the anchoring member which takes form of a loop.

FIG. 3e, depicts one embodiment of the anchoring member which takes form of flexible loop where the ends are attached separately.

There are many other possible embodiments of the anchoring member witch would have the same function. Even these examples can be varied by being a composite of more than one of these embodiments, or by being semi-flexible or rigid.

An optional elastic member, not shown, can be coupled to the upper portion of the anchoring member to bias hook 15 in a desired direction, thus keeping hook 15 oriented for minimal effort insertion or withdrawal of control bar 2.

In operation, for example when used with a kite buggy as shown in FIG. 4, after launching the kite (not shown) and mounting kite buggy 16 in conventional fashion, rider 17 maneuvers kite control yoke 2 to hook it underneath hook 15. Pulling forces imparted to yoke 2 by the flying kite through kite control wires 5 are thereby transferred through yoke 2 to hook 15 and through member 3 to anchor 6 and kite buggy 16. The kite thereby pulls buggy 16, while the driver has unlimited kite control without having to bear any of the kite's pulling force in his hands.

FIG. 4 depict a kite buggy 16 which is generally conventional, but for the kite anchoring system of the present invention 1.

Rider 17 may control the lies of the kite by tilting the control yoke 2, while it is coupled to the hook 15, in any direction and may also alternatively move control yoke 2 to either the rider's left, right, further or closer, in which case swivel mechanisms 4 again permit corresponding sideways deflection of member 3 and hook 15. It can thus be seen that the invention enables rider 17 to maneuver control yoke 2 through a range of positions constituting a substantial fraction of the positioning range attainable when control yoke 2 is not coupled to anchor 6. However, when control yoke 2 is coupled to anchor 6, rider 17 has substantial freedom to control the kite by manipulation of control yoke without having to personally absorb a significant portion of the kite's pulling force.

In FIG. 4a is shown one variant of the embodiment of the vertical longitudinal anchoring member 3a. This embodiment uses a hook 15 to couple this vertical longitudinal anchoring member with the control yoke. The lower end of this vertical longitudinal anchoring member is fixed rigidly 4 to the anchor 6, which is then rigidly connected to the buggy 16. The upper portion of the vertical longitudinal anchoring member has a swivelling mechanism 4 onto which is attached the hook 15.

FIG. 4b shows different embodiment of the anchor system 1 of this invention. In this embodiment the coupling mechanism is a swivelling pulley 4. In this version shown in the drawings, pulley coupling mechanism is attached to the underside of control yoke 2, but this location is not essential The vertical longitudinal anchoring member is the one shown in FIG. 3e. This embodiment comprises a guide cable which ends are attached separately, on the left and right side of the user, in this case, on the sides of the seat or on the sides of the buggy 16. In use, control yoke 2 is releasably anchored onto buggy 16 by hooking pulley underneath guide cable. In another embodiment the pulley could be permanently secured on the cable and have a hook which would couple onto the loop on the control yoke 2. In these embodiments, control yoke 2 may be easily moved from side to side, allowing pulley to follow guide cable. This cable also conveniently acts as a form of seatbelt for rider 17 in this embodiment.

As will be apparent to those skilled in the art in the light of the foregoing disclosure, many alterations and modifications are possible in the practice of this invention without departing from the spirit or scope thereof. For example, the present system is described as having a control yoke portion separate from an anchor portion. However, they could be integrated into a single, fixed system. Further, the anchor system of the present invention was described herein for illustrative purposes as useful for pulling a kite buggy. It should be appreciated that the invention could alternatively be provided on any vehicle powered by a kite, such as water borne vehicle or on a snow borne vehicle. Accordingly, the scope of the invention is to be construed in accordance with the substance defined by the following claims.

What I claim as my invention is:

1. A control yoke anchor system for a vehicle powered by a kite, the system comprising:
   a control yoke tethered to said kite by a plurality of kite control wires; and
   a longitudinally extending anchor member secured to said vehicle that releasably anchors said control yoke such that the control yoke is manipulable by a user of said vehicle between a first position free from said longitudinally extending anchor member and a second position secured to said longitudinally extending anchor member.

2. The control yoke anchor system of claim 1, wherein the longitudinally extending anchor member is rigid.

3. The control yoke anchor system of claim 1, wherein the longitudinally extending anchor member is flexible.

4. The control yoke anchor system of claim 1, wherein the longitudinally extending anchor member is a spring.

5. The control yoke anchor system of claim 1, wherein the longitudinally extending anchor member is a loop such that both ends of said loop are attached at the same place, or at two different locations.

6. The control yoke anchor system of claim 1, wherein the longitudinally extending anchor member is any combination of rigid, flexible, spring or loop member.

7. The control yoke anchor system of claim 1, wherein the control yoke member is a straight longitudinal member.

8. The control yoke anchor system of claim 1, wherein the control yoke member is a shaped longitudinal member.

9. The control yoke anchor system of claim 1, wherein the control yoke member is a longitudinal member with extendible portions.

10. The control yoke anchor system of claim 1, wherein the control yoke member is a longitudinal member with a plurality of extensions, each means for holding a tethering line.

11. The control yoke anchor system of claim 1, wherein the control yoke member is a longitudinal member that is smooth in the middle.

12. The control yoke anchor system of claim 1, wherein the control yoke member is a longitudinal member that has a notch in the middle.

13. The control yoke anchor system of claim 1, wherein the control yoke member is a longitudinal member that has a rigid or swivel hook in the middle.

14. The control yoke anchor system of claim 1, wherein the control yoke member is a longitudinal member that has a rigid or swivel eyelet in the middle.

15. The control yoke anchor system of claim 1, wherein the control yoke member is a longitudinal member that has a rigid or swivel loop in the middle.

16. The control yoke anchor system of claim 1, wherein one or both of the ends of the longitudinally extending anchor member are coupled by means of a pulley.

17. The control yoke anchor system of claim 1, wherein the ends of the longitudinally extending anchor member are coupled in any combination of rigid, flexible, swivelling, or releasable mechanisms.

18. The control yoke anchor system of claim 1, further comprising a flexible and semi-rigid sheath encircling said longitudinally extending anchor member between said first and second couplings.

19. The control yoke anchor system of claim 1, further comprising a winch associated with either of said control yoke, said longitudinally extending anchor member, or said vehicle, for controllably extending and retracting one or more of said kite control wires coupled to said control yoke.

* * * * *